(12) United States Patent
Leseigneur et al.

(10) Patent No.: US 11,899,489 B2
(45) Date of Patent: Feb. 13, 2024

(54) METHOD FOR DETERMINING THE BEHAVIOR OF A SMART CARD, AND RELATED SERVER

(71) Applicant: IDEMIA FRANCE, Courbevoie (FR)

(72) Inventors: Gilles Leseigneur, Courbevoie (FR); Jean-François Deprun, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 415 days.

(21) Appl. No.: 16/718,540

(22) Filed: Dec. 18, 2019

(65) Prior Publication Data
US 2020/0319667 A1    Oct. 8, 2020

(30) Foreign Application Priority Data
Dec. 19, 2018   (FR) ...................................... 1873371

(51) Int. Cl.
| | | |
|---|---|---|
| *G06F 1/10* | (2006.01) | |
| *G06F 1/14* | (2006.01) | |
| *G06K 19/07* | (2006.01) | |
| *H04L 9/32* | (2006.01) | |

(52) U.S. Cl.
CPC ................ *G06F 1/10* (2013.01); *G06F 1/14* (2013.01); *G06K 19/07* (2013.01); *H04L 9/3228* (2013.01); *H04L 9/3297* (2013.01)

(58) Field of Classification Search
CPC ... G06F 1/10; G06F 21/34; G06F 1/14; G06F 21/44; G06F 21/725; G06K 19/07; H04L 63/0838; H04L 9/3297
See application file for complete search history.

(56) References Cited

U.S. PATENT DOCUMENTS

| | | | | |
|---|---|---|---|---|
| 2016/0191504 A1* | 6/2016 | Kim | ...................... | H04W 12/06 726/6 |
| 2016/0262122 A1* | 9/2016 | Aldana | ................. | H04W 24/10 |
| 2016/0328716 A1* | 11/2016 | Touvet | ............... | G06K 19/0728 |
| 2018/0285546 A1* | 10/2018 | Greenberg | ............ | H04L 9/0891 |

FOREIGN PATENT DOCUMENTS

| | | |
|---|---|---|
| CN | 102435975 B | 1/2015 |
| WO | 2017212157 A1 | 12/2017 |

OTHER PUBLICATIONS

Preliminary Search Report issued in corresponding French Patent Application No. 1873371 dated Sep. 17, 2019, pp. 1-9.
European Notification under Article 94 (3) EPC issued in European Patent Application No. 19217172.6 dated Jun. 7, 2021, 5 pages.

\* cited by examiner

*Primary Examiner* — Farid Homayounmehr
*Assistant Examiner* — Brian William Avery
(74) *Attorney, Agent, or Firm* — MH2 TECHNOLOGY LAW GROUP, LLP

(57) ABSTRACT

A method for determining a behavior of a smart card, which may be implemented by a server. The method includes operations for obtaining a first reference time data corresponding to a time for setting a smart card clock, and a second reference time data corresponding to a time for reading a first time data from the clock, determining a time drift associated with the smart card based on the first reference time data and on the second reference time data, and determining a behavior of the smart card from the time drift.

17 Claims, 4 Drawing Sheets

METHOD FOR DETERMINING THE BEHAVIOR OF A SMART CARD, AND RELATED SERVER

CROSS-REFERENCE TO RELATED APPLICATIONS

This application claims priority to French Patent Application No. 1873371, filed on 19 Dec. 2018.

TECHNICAL FIELD

The present invention relates to the field of smart cards, and relates more particularly to a method for determining a behavior of a smart card.

The invention applies in particular, but not exclusively, to ID-1 format bank cards specified in the standard ISO/IEC 7810, having the dimensions of 85.6 millimeters×53.98 millimeters×0.76 millimeters.

The invention also applies to smart cards with contacts whose characteristics are detailed in the standard ISO/IEC 7816, and can also apply to contactless smart cards whose characteristics are detailed in the standard ISO/IEC 14443.

PRIOR ART

In a known manner, a smart card can include a clock that allows performing operations as a function of time, for example operations of generating and displaying a dynamic verification code (OTP for "One Time Password", or dCVV for "Dynamic Card Verification"), used to secure transactions, for example online banking payments. During an online payment, the user of such a smart card indicates the PAN (Primary Account Number) card number, the expiration date of the card, the name of the cardholder, as well as a dynamic verification code displayed by the card, a new dynamic verification code being generated and displayed several times a day.

To perform the operation of generating a dynamic verification code, the card must be time-synchronized with a suitable server to verify the code. If the clock of the card is not accurate, the card can be de-synchronized from the server, which may result in an error and in stopping the banking payment.

The clock can thus be calibrated during the manufacture of the smart card. A known calibration method comprises a step of setting the clock, in which a calibration terminal records, in the clock of the smart card, the current date and time of a reference clock, such as the atomic clock.

Then, for a first duration of about ten days, the clock increments the recorded date and time, according to the resonant frequency of its oscillator.

At the end of this first duration, the current date and time of the clock are read by the calibration terminal (or another calibration terminal), and then compared with the current date and time of the reference clock. The result of the comparison allows the calibration terminal to calculate the natural time drift of the clock, and thus to calculate calibration data that allow correcting the natural time drift.

These calibration data are then recorded in the clock. In addition, the calibration terminal records once again, in the clock of the smart card, the current date and time of the reference clock.

Then, for a second duration, counted in days, the clock increments the recorded date and time, according to the resonant frequency of its oscillator and to the calibration data.

At the end of this second duration, the current date and time of the clock are read by the calibration terminal (or another calibration terminal), and then compared with the current date and time of the reference clock.

If the corrected time drift of the clock is less than 0.8 seconds per day, the calibration data allow correcting the natural time drift of the clock in an acceptable manner. Otherwise, the calibration data do not correct the natural time drift of the clock in an acceptable manner, and the method is then repeated so as to calculate new calibration data.

This calibration method comprises many steps, implemented during the manufacture of the card, and requires a lapse of long periods of time between the recording steps and the reading steps. The duration for manufacturing the smart card is thus significant.

The manufacturing duration can be further lengthened when repeating the method, when the calculated calibration data do not allow correcting the natural time drift of the clock in an acceptable manner.

In addition, the calibration data do not allow taking in account modifications of the time drift occurring after the manufacture of the card, these modifications being typically due to the age of the card or to external factors present in the environment of the card, for example temperature, noise, absence or presence of ultraviolet rays.

DISCLOSURE OF THE INVENTION

The present invention relates to a method for determining a behavior of a smart card, called first smart card, implemented by a server, comprising the following steps:
  obtaining a first reference time data corresponding to a time for setting a smart card clock, and a second reference time data corresponding to a time for reading a first time data of said clock,
  determining a time drift associated with the first smart card based on said first reference time data and on said second reference time data,
  determining a behavior of the first smart card from said time drift.

The determination of the time drift by the server makes it possible to dispense with the calculation of calibration data for the first smart card during its manufacture.

Indeed, since the server knows a time drift associated with the first smart card, it can use this time drift to determine the behavior of the first smart card. It is not necessary to correct this time drift.

Thus, it is not necessary to record these calibration data in the first smart card and then to verify whether these calibration data allow correcting the time drift of the first smart card. The method therefore allows reducing the duration for manufacturing the first smart card.

In addition, the method can allow reducing the rejection rate associated with the manufacture of the first smart card. Indeed, during the manufacture of the first smart card, each step of reading or writing data in the first smart card can damage the first smart card. The number of tools used during the manufacture is also reduced.

Furthermore, the determination of the time drift by the server makes it possible to accurately correct the time drift. Indeed, the resonant frequency of the oscillator of the clock of the first smart card can vary according to the age of the card and/or according to external factors present in the card storage environment, such as the temperature, the noise, the absence or the presence of ultraviolet rays. Such factors may change after the manufacture of the card, and be taken into account for the calculation of the time drift.

In addition, the method according to the invention being implemented by a server, it can be carried out throughout the lifetime of the first smart card. Thus, the time drift can be determined with accuracy, a long period being able to separate the setting time from the reading time.

Each drift calculated by the server can also be used to develop new products, in order to select card architecture or a robust component.

In one particular embodiment, the first smart card comprises said clock.

In one particular embodiment, a second smart card comprises said clock, the first smart card and the second smart card being part of the same manufacturing batch of smart cards.

The behavior of the first smart card can be determined from the time drift dt of the second smart card because the first smart card and the second smart card are part of the same manufacturing batch. Thus, the clock of the first smart card comprises similarities with the clock of the second smart card, due to similar or identical conditions of manufacture and/or storage of the clocks or the smart cards. Also, it is possible to determine the behavior of several smart cards of the same manufacturing batch by determining the time drift dt of one or two smart cards of this manufacturing batch.

The duration for manufacturing the first smart card is thus further reduced.

In one particular embodiment, the server is an authentication server, able to authenticate the first smart card.

In one particular embodiment, the time drift is also determined based on information on the manufacture or use of the first smart card, stored in the server.

In one particular embodiment, said second reference time data is received:
  during a phase of manufacture of the second smart card, or
  during a phase of use of the second smart card, during a first transaction implemented by means of said second smart card,
  said first time data of the clock being also received.

In one particular embodiment, said second reference time data is received:
  during a phase of manufacture of the first smart card, or
  during a phase of use of the first smart card, during a first transaction implemented by means of said first smart card,
  said first time data of the clock being also received.

Obtaining the second reference time data during the card use phase allows reducing the card manufacturing duration.

Obtaining the second reference time data during the card manufacturing phase allows not modifying the exchange protocol between the transaction terminals and the server, and thus not modifying the transaction terminals.

In one particular embodiment, the step of determining a behavior comprises obtaining a time data of the clock of the first smart card, called second time data of the clock and a third reference time data corresponding to a time for reading the second time data of the clock, during a second transaction implemented by means of said first smart card,
  wherein the determined behavior is determined based on the third reference time data.

In one particular embodiment, the behavior of the first determined smart card is a time de-synchronization of the first smart card relative to the server,
  the step of determining a behavior of the first smart card comprising:
    a determination of a corrected security code from the time drift.

In one particular embodiment, the behavior of the first determined smart card is a time de-synchronization of the first smart card relative to the server, and
  the step of determining a behavior of the first smart card further comprises:
    a comparison of the corrected security code with a received security code, said received security code having been emitted by the first smart card.

In one particular embodiment, the method further comprises an authentication of the first smart card, based on the result of the comparison of the determined security code with the received security code.

In one particular embodiment, said second reference time data is received during a phase of use of the first smart card, during a third transaction implemented by means of the first smart card,
  the determination of the time drift comprising a definition of the time drift at a given value,
  the time drift being modified if the determined corrected security code is different from the received security code.

In one particular embodiment, the given value is determined based on a previously determined time drift.

The invention further relates to a server able to implement a method as described above.

In one particular embodiment, the different steps of the method as described above are determined by computer program instructions.

Consequently, the invention also relates to a computer program on an information medium (or recording medium), this program being likely to be implemented by a server or more generally in a computer, this program including instructions adapted to the implementation of the steps of a method as described above.

This program can use any programming language, and be in the form of source code, object code, or intermediate code between source code and object code, such as in a particularly compiled form, or in any other desirable form.

The invention also relates to an information medium (or recording medium) readable by a server or more generally by a computer, and including instructions of a computer program as mentioned above.

The information medium can be any entity or device capable of storing the program. For example, the medium may include a storage means, such as a rewritable non-volatile memory (of the "EEPROM" or "Flash NAND" type for example), or such as a "ROM", for example a "CD ROM" or a "ROM" of a microelectronic circuit, or a magnetic recording means, for example a floppy disc or a hard disk.

On the other hand, the information medium can be a transmissible medium such as an electrical or optical signal, which can be routed via an electrical or optical cable, through radio or other means. The program according to the invention can be particularly downloaded on an Internet-type network.

Alternatively, the information medium can be an integrated circuit in which the program is incorporated, the circuit being adapted to execute or to be used in the execution of the method in question.

BRIEF DESCRIPTION OF THE DRAWINGS

Other characteristics and advantages of the present invention will emerge from the description given below, with reference to the appended drawings which illustrate an exemplary embodiment without any limitation. In the figures.

DESCRIPTION OF THE EMBODIMENTS

The present invention relates to the field of smart cards (also called "microcircuit cards"), and more particularly relates to a method for determining a behavior of a smart card.

The invention applies in particular, but not exclusively, to ID-1 format bank cards specified in the standard ISO/IEC 7810, having the dimensions of 85.6 millimeters×53.98 millimeters×0.76 millimeters.

The invention can also apply to the smart cards with contacts whose characteristics are detailed in the standard ISO/IEC 7816, and can also apply to the contactless smart cards whose characteristics are detailed in the standard ISO/IEC 14443.

Figure 1:
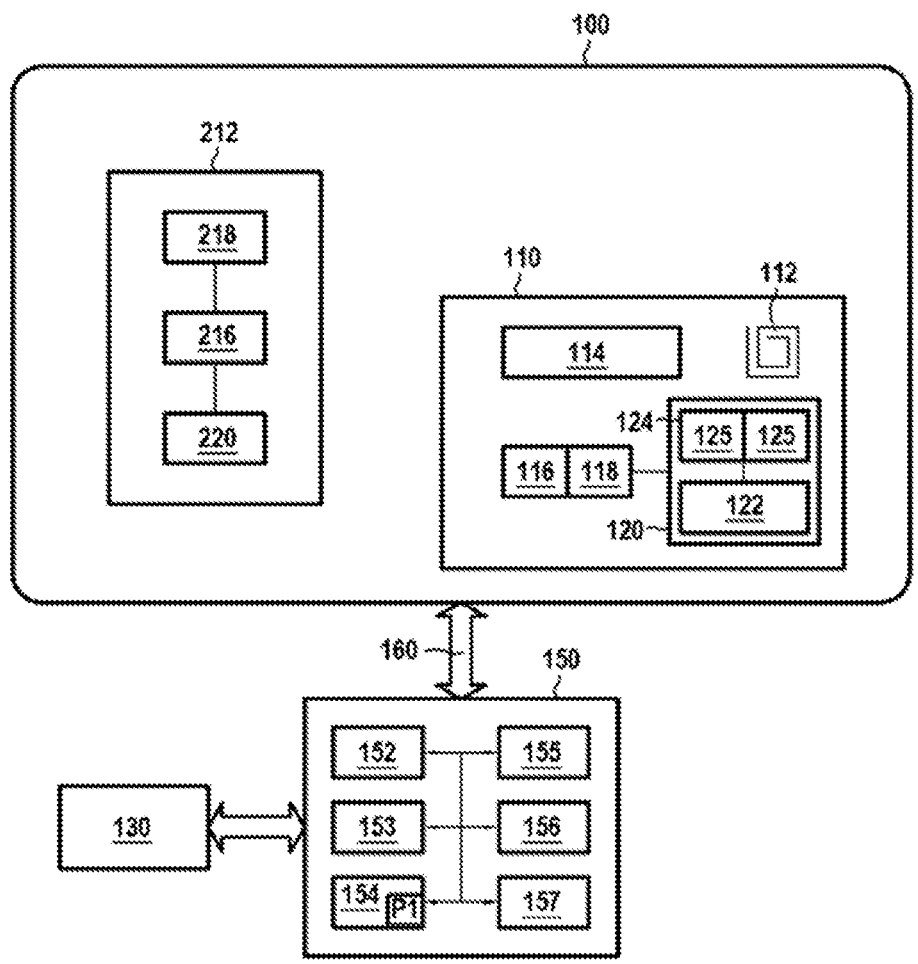
FIG. 1 represents, schematically, a server according to one exemplary embodiment of the invention.

FIG. 1 schematically represents a server 150 according to one exemplary embodiment of the invention, able to implement a method for determining a behavior of one or several smart cards 100, 130, according to one exemplary embodiment, for example the method described with reference to FIG. 3 or the method described with reference to FIG. 8.

In the example of FIG. 1, the server 150 is able to determine the behavior of a first smart card 100 and of a second smart card 130, the first smart card 100 and the second smart card 130 belonging to the same manufacturing batch of smart cards. However, it will be understood that the server is able to determine the behavior of one or several other smart cards, belonging to the same manufacturing batch or to a different manufacturing batch.

Each smart card 100, 130 includes a circuit 110 including a clock 120, a microprocessor 116, a memory 118, a wireless communication antenna 112 and can include a battery 114.

By "Clock" is meant an electronic circuit continuously emitting periodic pulses allowing an accurate time counting for a system.

The clock 120 includes an oscillator 122 and a circuit for processing 124 the signal emitted by the oscillator, the processing circuit 124 including registers 125. The processing circuit 124 is configured to count (or measure or determine) the time.

The circuit 110 can be a flexible electronic circuit, for example adapted to generate and display a dynamic verification code (OTP for "One Time Password", or dCVV for "Dynamic Card Verification") of the card, allowing secure transactions such as online banking payments. In addition, the circuit 110 may include a screen adapted to display a dynamic verification code.

The clock is typically a Real-Time Clock (RTC) which can use the UTC ("Coordinated Universal Time") time scale.

In addition, the oscillator 122 may comprise a low-frequency quartz oscillator, resonating for example at a resonant frequency fr of about 32 kilohertz. In addition, the oscillator 122 may comprise an oscillating circuit comprising a resistor and a capacitor.

The registers 125 comprise, for example, calendar or time registers, at least one calibration register, and can include RTC configuration registers (for example error detection, read and write registers, or relating to a type of alarm). In one example, the processing circuit 124 includes at least one register among a first time register adapted to count the seconds, a second time register adapted to count the minutes, a third time register adapted to count the hours, a fourth time register adapted to count the days, a fifth time register adapted to count the months and a sixth time register adapted to count the years.

Each smart card 100, 130 can also include a circuit or a module separate from the circuit 110, such as the module 212 described with reference to FIG. 2.

The server 150 is, for example, an authentication server, able to authenticate the smart card during a transaction made by means of said smart card. The server 150 is typically adapted to verify a dynamic verification code during a transaction.

Terminal 150 presents the conventional architecture of a computer. The terminal 150 in particular includes a processor 152, an operating system 153, a read-only memory 154 ("ROM" type), a rewritable non-volatile memory 155 (for example "EEPROM" or "Flash NAND" type), a rewritable volatile memory 156 ("RAM" type), and a communication interface 157.

In this example, the read-only memory 154 constitutes an information (or recording) medium according to one particular embodiment of the invention. In the read-only memory 154 is stored a computer program P1 allowing the server 150 to implement a determination method according to one exemplary embodiment of the invention. As a variant, the computer program P1 is stored in the rewritable non-volatile memory 155.

Figure 2:
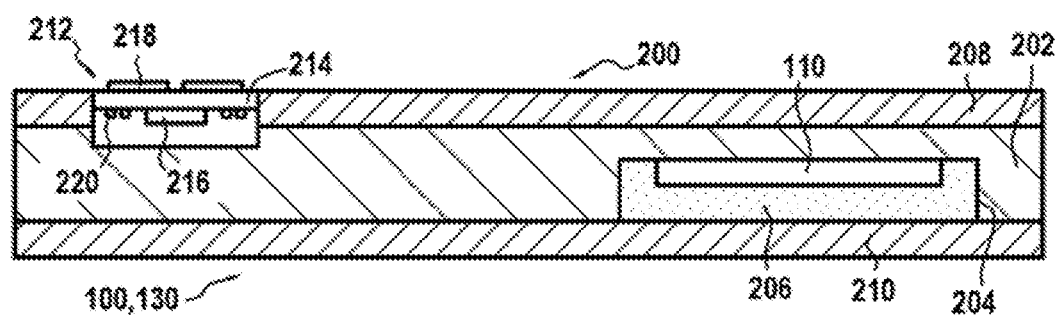
FIG. 2 represents, schematically, an example of a sectional view of a smart card whose behavior can be determined by the server of FIG. 1.

FIG. 2 schematically represents an example of a sectional view of the first smart card 100 and/or of the second smart card 130 of FIG. 1. The smart card 100, 130 includes a card body 200 including a first layer 202 that may include a cavity 204. The circuit 110 is then positioned in the cavity 204 and is fixed by means of a resin 206. The card body 200 may also include at least another layer, for example a second layer 208 and a third layer 210, the first layer 202 being for example positioned between the second layer 208 and the third layer 210. As a variant, the card body 200 includes only the first layer 202.

The smart card 100, 130 can include a module 212 separate from the circuit 110, this module 212 being able to be connected to the circuit 110, typically in the case where time data are obtained via a transaction without security code (for example a conventional contact or contactless banking transaction). As a variant, the module 212 may not be connected to the circuit 110, typically in the case where time data are obtained via a transaction with security code.

In one example, the module 212 includes a substrate 214 and an electronic chip 216 fixed to the substrate 214. The electronic chip 216 is adapted to make a banking payment according to the "EMV" ("Europay Mastercard Visa") standard. The electronic chip 216 can thus implement applications that allow making banking transactions.

The module 212 may include external contacts 218, adapted to make a contact payment, and/or an antenna 220, adapted to make a contactless payment. As a variant, the smart card 100, 130 does not include a module 212.

Alternatively, the antenna 220 may be in a layer 202, 208, 210 of the card body, or in the circuit 110, and be connected to the module 212.

Figure 3:
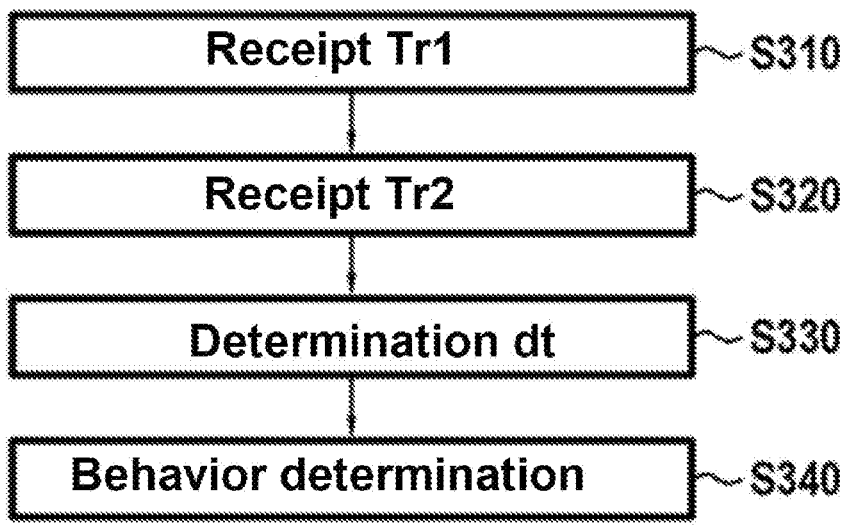
FIG. 3 represents, in the form of a flowchart, the main steps of a method of determining a behavior of a smart card, according to one exemplary embodiment of the invention.
Figure 8:
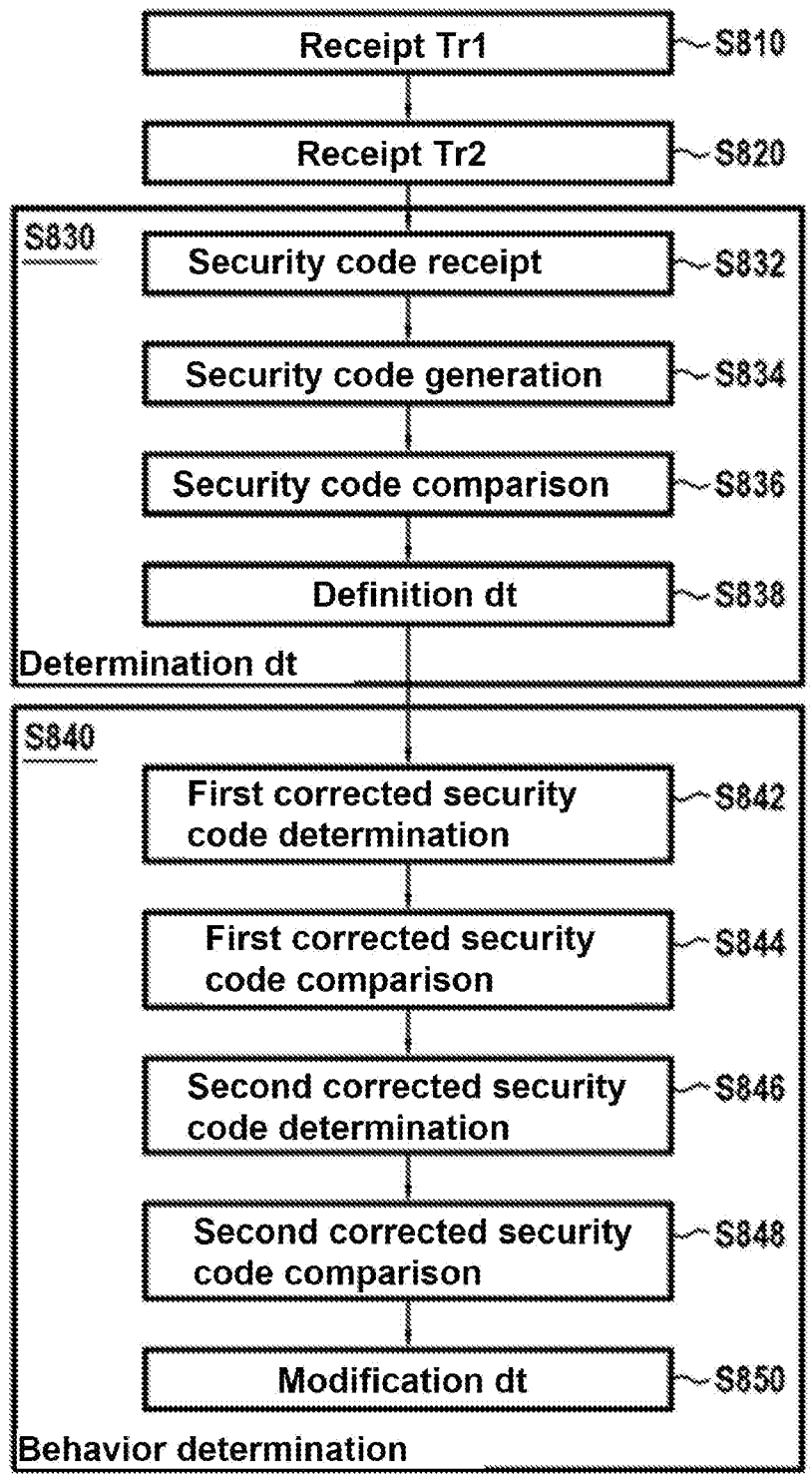
FIG. 8 represents, in the form of a flowchart, the main steps of a method for determining a behavior of a smart card, according to one exemplary embodiment of the invention.

FIGS. 3 and 8 represent methods for determining a behavior of one or several smart cards, according to one exemplary embodiments of the invention.

In the following description, it is considered that each of the determination methods of FIGS. 3 and 8 is implemented by the server 150 of FIG. 1, in order to determine the behavior of the first smart card 100 of FIG. 1, or the behavior of the second smart card 130 of FIG. 1.

As a variant, each of these determination methods can be implemented by a system comprising the server 150 and one or several other servers having architecture similar to the server 150, each server of the system being able to communicate with the other servers of the system.

FIG. 3 represents a method for determining a behavior of one or several smart cards, according to one exemplary embodiment of the invention.

At a setting time t1, a first reference time data Tr1 can be recorded in the clock 120 of the first smart card 100, typically in the time registers 125 of the clock 120. This recording can be carried out by a personalization terminal, for example during a phase of manufacture of the smart card 100.

The first reference time data Tr1 typically corresponds to the current date and time, at the setting time t1, of a reference clock, such as the atomic clock or the clock of the personalization terminal.

The first reference time data Tr1 is incremented by the clock 120, after its recording in the clock 120.

Following this recording, the server 150 can obtain, in a step S310, the first reference time data Tr1 corresponding to the setting time t1. This first reference time data Tr1 is typically transmitted by the personalization terminal having recorded this data in the clock 120, then received by the server 150. As a variant, the server 150 receives a message from the personalization terminal or from the first smart card 100, then determines the first reference time data Tr1 by consulting the reference clock when the message is received.

Then, in a step S320, the server 150 can obtain a second reference time data Tr2, corresponding to a first time for reading t2 a first time data Tc1 of the clock 120 of the first smart card 100.

During this step S320, the first time data of the clock Tc1 can also be received by the server 150.

Figure 4:
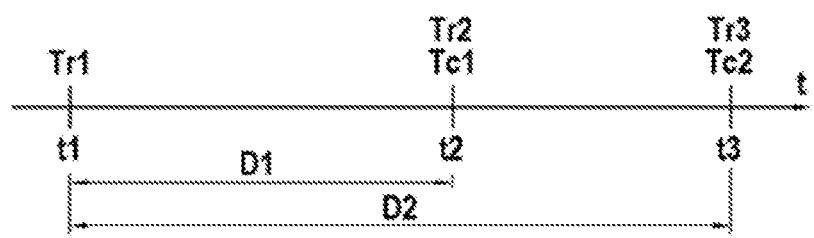
FIG. 4 is a graph representing different moments associated with time data that can be received in some steps of a determination method according to one exemplary embodiment of the invention.

The first time data of the clock Tc1 typically corresponds to the first reference time data Tr1 incremented by the clock 120 for a first duration D1 between the setting time t1 and the first reading time t2 (see FIG. 4). More specifically, the first time data of the clock Tc1 can correspond to the first reference time data Tr1 incremented by the clock 120 as a function of the resonant frequency of the oscillator 122 of the clock 120 during the first duration D1.

The second reference time data Tr2 may correspond to the first reference time data Tr1 incremented by the reference clock (for example as a function of the resonant frequency of the oscillator of the clock of the reference clock), during the first duration D1. The second reference time data Tr2 thus typically corresponds to the current date and time, at the first reading time, of the reference clock.

The second reference time data Tr2 and/or the first time data Tc1 are typically received by the server 150 during a phase of manufacture of the first smart card 100, following the reading of the first time data Tc1 by a terminal, typically the personalization terminal having recorded the first reference time data Tr1 in the smart card 100, or another personalization terminal. The terminal then transmits the second reference time data Tr2 and/or the first time data Tc1. As a variant, the server 150 receives a message from the terminal or from the first smart card 100, then determines the second reference time data Tr2 by consulting the reference clock when the message is received.

As a variant, the second reference time data Tr2 is received during a phase of use of the first smart card 100, the use phase being subsequent to the manufacturing phase, and starting typically after the delivery of the card to its user. The second reference time data Tr2 is for example obtained during a transaction, called first transaction, implemented by means of the first smart card 100. A transaction terminal, called first transaction terminal, can then read the first time data of the clock Tc1, then transmits the second reference time data Tr2 and the first time data of the clock Tc1 to the server 150, for example in a custom field of an authentication request.

The first transaction is typically a transaction for which no security code is sent (for example, a banking transaction via the electronic chip 216, with or without contact). As a variant, the first transaction may be a transaction using a dynamic verification code.

As a variant, the server 150 receives a message from the transaction terminal or from the first smart card 100, then determines the second reference time data Tr2 by consulting the reference clock when the message is received.

In a step S330, the server 150 can determine a time drift dt associated with the first smart card 100. This time drift dt is typically the time drift of the clock 120 of the first smart card 100, as a function of the first reference time data Tr1, of the second reference time data Tr2 and of the first time data of the clock Tc1.

The time drift dt is typically calculated by subtracting the second reference time data Tr2 from the first time data of the clock Tc1 (first subtraction), by subtracting the first reference time data Tr1 from the second reference time data Tr2 (second subtraction), then by dividing the result of the first subtraction by the result of the second subtraction.

The time drift dt of the clock 120, can therefore be calculated from the following formula:

$$dt = \frac{Tc1 - Tr2}{Tr2 - Tr1} \qquad \text{[Math. 1]}$$

The time drift dt can also be determined based on one or several pieces of information on the manufacture of the first smart card 100, stored in the server 150. As a variant, this information on the manufacture is stored in another server, such as a server used during the manufacture of the first smart card 100. The server 150 can then communicate with this other server to obtain this information on the manufacture.

Each information on the manufacture can be information on a component of the card (typically the clock 120), or information on the conditions of manufacture or information on the storage of the card.

The information on a component of the card can be, for example, a name, a serial number, a manufacturer, a batch number of manufacture or a date of manufacture of the component.

The information on the manufacturing conditions can be a tool used for the manufacture, a date of manufacture, a schedule of manufacture or a plant of manufacture of the card.

The information on the storage can be the storage location, the storage duration, the storage temperature, etc.

The server 150 can indeed use this information in order to determine a potential modification of the time drift during the lifetime of the smart card. The determination of this potential modification can be based on a time drift calculated for another card from the same manufacturing batch. Indeed, the information on the manufacture is typically similar for each smart card from the same manufacturing batch. The information can thus be used to identify the cards that have undergone one or several similar manufacturing conditions, said conditions having been identified as correlated to a potential modification of the time drift.

The time drift dt can also be determined based on one or several pieces of information on the use of the first smart card 100, for example stored in the server 150, such as the main country in which the card is used, the type of use, the type of user, etc. The server 150 can again use such information to determine a potential modification of the time drift during the lifetime of the smart card.

After having determined the time drift dt, the server 150 records this time drift dt, in association with an identifier of the first smart card 100, and/or an identifier of the manufacturing batch of the first smart card 100.

Steps S320 and S330 can be repeated, during the lifetime of the first smart card 100, in order to update the time drift dt, typically periodically (for example every month, or every 10 transactions) and/or upon receipt of an update request. This repetition of steps S320 and S330 makes it possible to obtain a more accurate time drift dt.

As a variant, steps S310, S320 and S330 are implemented for the second smart card 130 instead of the first smart card 100. Thus, the first reference time data Tr1 is recorded in the clock of the second smart card 130. The first time data Tc1 obtained in step S320 corresponds to the first reference time data Tr1 incremented by the clock of the second smart card 130 during the first duration D1. Step S320 is implemented during a phase of manufacture of the second smart card 130, or during a phase of use of the second smart card 130 during a transaction, called first transaction, implemented by means of the second chip card 130.

Next, in step S330, the server 150 determines a time drift dt of the clock of the second smart card 130.

In a step S340, the server 150 determines a behavior of the first smart card 100 from said time drift dt determined in step S330, that is to say from the time drift dt of the clock 120 of the first smart card 100, or from the time drift dt of the clock of the second smart card 130. This step is typically implemented after the phase of manufacture of the first smart card 100, for example during the phase of use of this first smart card 100.

The behavior of the first smart card 100 can be determined from the time drift dt of the second smart card 130 because the first smart card 100 and the second smart card 130 are part of the same manufacturing batch. Thus, the clock 120 of the first smart card 100 comprises similarities with the clock of the second smart card 130, due to similar or identical conditions of manufacture of the clocks or the smart cards. Also, it is possible to determine the behavior of several smart cards from the same manufacturing batch by determining the time drift dt of one or two smart cards from this manufacturing batch.

The behavior determined in step S340 is for example a time de-synchronization of the first smart card 100 with respect to the server 150.

This time de-synchronization of the first smart card 100 is typically due to a lack of accuracy of the clock 120 of the smart card 100, for example when the resonant frequency of the oscillator 122 is not equal to the resonance frequency of the reference clock used by the server 150, typically when the resonant frequency of the oscillator 122 is not equal to 32 kilohertz.

The time drift thus makes it possible to quantify the time de-synchronization of the first smart card 100 with the server 150.

This time de-synchronization can be determined by the server 150 as part of a verification of a security code such as a dynamic verification code.

The principle of the dynamic verification is explained with reference to FIG. 5. As shown in this figure, the first smart card 100 divides the time into successive periods Pc1-Pcn. The periods Pc1-Pcn are typically of equal theoretical durations, for example of thirty minutes.

Since time is measured at the first chip card 100 by the clock 120, the first chip card 100 determines the beginning of each new period Pc1-Pcn by means of the clock 120. The effective duration of the periods Pc1-Pcn as determined at the first smart card 100 therefore depends on the clock 120. The effective durations of the periods Pc1-Pcn can thus differ from the theoretical duration, for example as determined by the reference clock, used by the server 150.

In addition, the server 150 can divide the time into successive periods Ps1-Psn, of theoretical durations equal to the theoretical durations of the periods Pc1-Pcn periods of the first smart card 100.

Since the time is measured at the server 150 by the reference clock, the effective duration of the periods Ps1-Psn as determined at the server 150 therefore depends on the reference clock. Also, in the case where the theoretical duration is determined by the reference clock, the effective duration of the periods Ps1-Psn as determined at the server 150 is equal to the theoretical duration of the periods Ps1-Psn.

The first smart card 100 generates a new dynamic verification code Cc1-Ccn at the beginning of each new period Pc1-Pcn of the first smart card 100. The time of generation of the dynamic verification codes Cc1-Ccn thus depends on the clock 120 of the first smart card 100.

During a transaction made via the first smart card 100, under normal conditions of use of the first smart card 100, the dynamic verification code Ccj corresponding to the current period Pcj for the first smart card chip 100, is sent to the server 150. The first chip card 100 can also send the PAN card number, the expiration date of the card and/or the name of the cardholder.

It is meant by "normal conditions of use" conditions in which transactions are allowed, as opposed to abnormal conditions of use, where the possibility of making transactions, for example after a theft or a loss of the first smart card 100, is desired to be blocked. Thus, under abnormal conditions of use, the transactions are rejected whatever the result of the verification of the dynamic verification codes.

When the server 150 receives the dynamic verification code Ccj from the first smart card 100, the server 150 generates a dynamic verification code corresponding to the current period at the time of the transaction for the server 150, i.e. according to the reference clock. The first smart card 100 and the server 150 are configured so that, for any integer i, the same dynamic verification code is associated with the period Pci by the first smart card 100 and independently with the period Psi by the server 150.

The server 150 typically determines the current period according to the reference clock from the expiration date of the first smart card 100. As a variant, the server 150 determines the current period according to the reference clock without using the expiration date.

The server 150 compares the dynamic verification code generated by the server 150 with the dynamic verification code received by the server 150.

Figure 5:
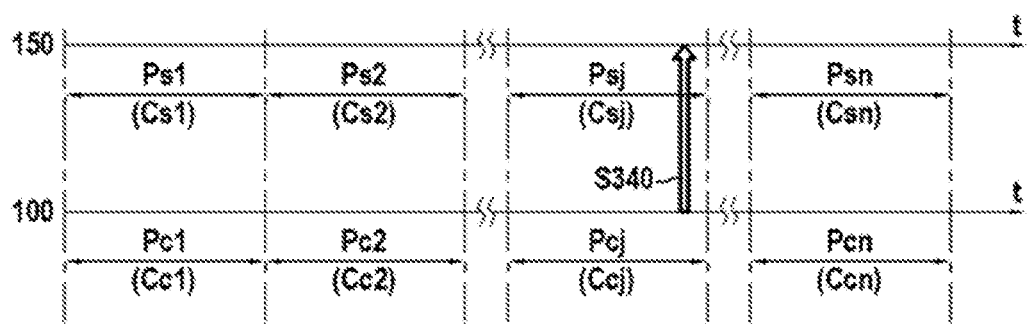
FIG. 5 is a graph representing different periods for a smart card and a server according to one exemplary embodiment of the invention.

In the case, represented in FIG. 5, where the first smart card 100 is time-synchronized with the server 150, the current period Pcj for the first smart card 100 corresponds to the current period Psj for the server 150.

Also, under normal conditions of use of the first smart card 100, the dynamic verification code Csj generated by the server 150 corresponds to the dynamic verification code Ccj received by the server 150, and the server 150 can then authenticate the first smart card 100.

Figure 6:
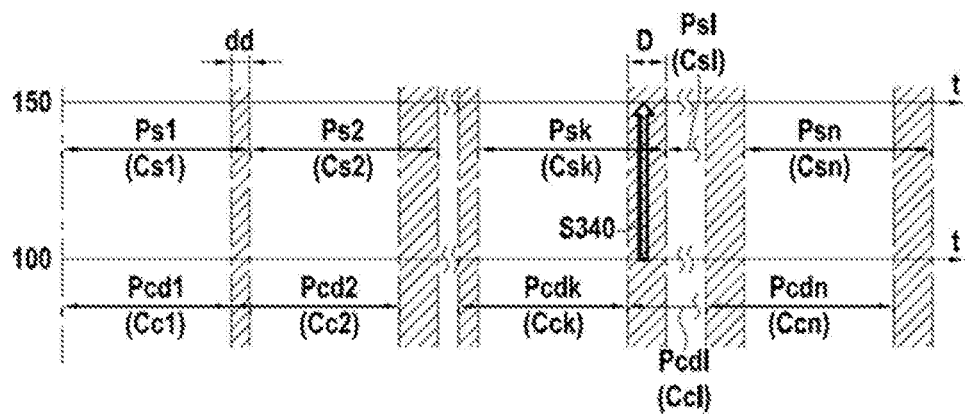
FIG. 6 is a graph representing different periods for a smart card and a server according to one exemplary embodiment of the invention.

With reference to FIG. 6, if the first smart card 100 is not time-synchronized with the server 150, the dynamic verification code Ccl sent by the first smart card 100 may not correspond to the dynamic verification code Csk associated with the current period Psk determined by the server 150.

Indeed, due to the time de-synchronization, the effective duration of the period of the first smart card 100 determined by the clock 120 differs from the effective duration of the period of the server 150 determined by the reference clock, for example by a de-synchronization duration dd. This difference can cause, over the successive periods, an increasingly large offset D between the first smart card 100 and the server 150. The offset D is typically calculated by multiplying the de-synchronization duration dd by the number of the period.

Thereafter, at a given time during an offset, the first smart card 100 can consider that the current period is the $l^{th}$ period Pcdl, while according to the server 150, the current period is the $l^{th}$ period Psk, this $k^{th}$ period Psk being different from the $l^{th}$ period Pcdl. FIG. 6 represents examples of offsets D, by hatched areas.

The step S340 of determining a time de-synchronization is typically implemented during a transaction, called second transaction, implemented by means of the first smart card 100.

The second transaction is typically a transaction using a security code such as a dynamic verification code. Thus, the second transaction is typically an online banking transaction. A significant duration can elapse between the first transaction and the second transaction.

Figure 7:
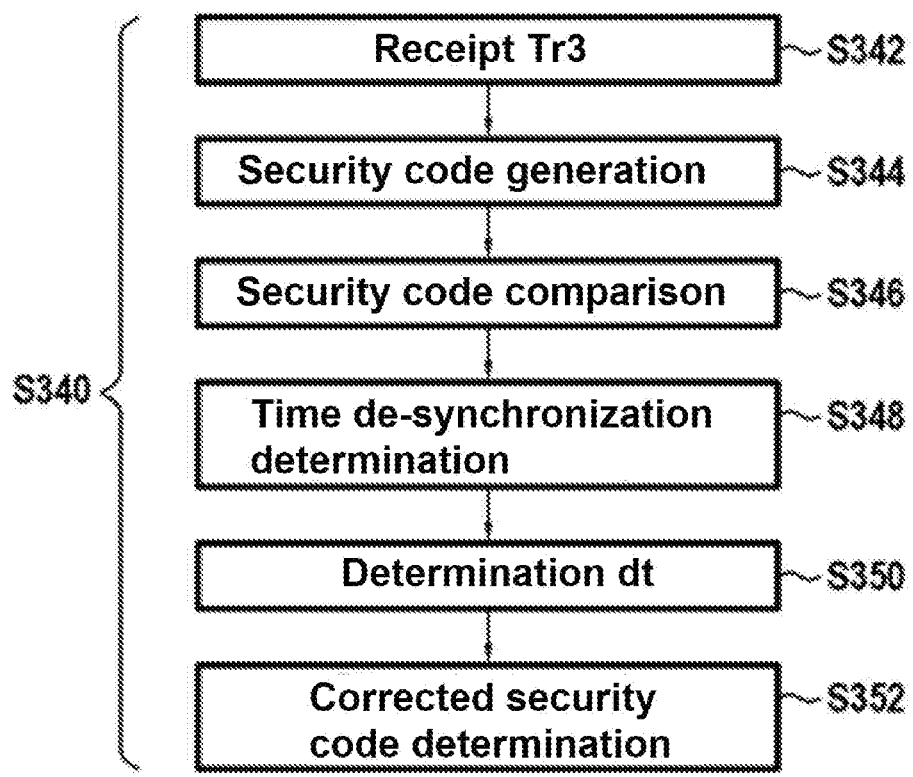
FIG. 7 represents, in the form of a flowchart, the main sub-steps of a step of determining a behavior of a determination method, according to one exemplary embodiment of the invention.

As shown in FIG. 7, the step S340 of determining a time de-synchronization then typically comprises a sub-step S342 of obtaining a third reference time data Tr3 corresponding to a second time of reading t3 a data time of the clock Tc2 of the first smart card 100, called second time data of the clock Tc2.

The second time data of the clock Tc2 typically corresponds to the first reference time data Tr1 incremented by the clock 120 for a first duration D2 between the setting time t1 and the second reading time t3 (see FIG. 4). More specifically, the second time data of the clock Tc2 can correspond to the first reference time data Tr1 incremented by the clock 120 as a function of the resonant frequency of the oscillator 122 of the clock 120 for the second duration D2.

The third reference time data Tr3 may correspond to the first reference time data Tr1 incremented by the reference clock (for example as a function of the resonant frequency of the clock oscillator of the reference clock), for the second duration D2. The third reference time data Tr3 thus typically corresponds to the current date and time, at the second reading time t3, of the reference clock.

The third reference time data Tr3 is typically transmitted by a transaction terminal, called second transaction terminal, with which the first smart card 100 cooperates to make the second transaction. The second terminal is typically a mobile terminal, such as a laptop, a tablet or a phone.

The second transaction terminal can transmit the third reference time data Tr3, for example at the same time as a security code corresponding to the current period for the first smart card 100, this current period comprising the second time data of the clock Tc2. As a variant, the server 150 receives a message from the second transaction terminal or from the first smart card 100, then determines the third reference time data Tr3 by consulting the reference clock when the message is received.

The server 150 can then generate, in a sub-step S344, a security code corresponding to the current period at the time of the obtaining sub-step S342 for the server 150, that is to say according to the reference clock, then compare the received security code and the generated security code (sub-step S346). As a variant, the sub-steps S344 and/or S346 are not implemented. For example, the server 150 can generate the security code in the sub-step S344, this generated security code being then sent to another server which makes the comparison with the security code it has received, for example from the second transaction terminal, before sending the result of the comparison to the server 150.

In a step S348, the server 150 can determine a time de-synchronization by means of the result of the comparison and/or of the time drift dt of the first smart card 100 or of another smart card of the manufacturing batch of the first smart card 100, such as the second smart card 130.

For example, a time de-synchronization is determined by the server 150 if the security code received in the sub-step S342 does not correspond to the security code generated in the sub-step S344 and if the recorded time drift dt determined in the step S330 is greater than a given drift threshold. As a variant, when the sub-steps S344 and/or S346 are not implemented, the time de-synchronization can be determined by the server 150 only if the recorded time drift dt determined in the step S330 is greater than a given drift threshold.

The second time data of the clock Tc2 can also be sent, typically at the same time as the third reference time data Tr3 in the sub-step S342. The server 150 can then update or determine the time drift dt of the first smart card 100 (sub-step S350), for example by calculating the time drift dt from the following formula:

$$dt = \frac{Tc2 - Tr3}{Tr3 - Tr1} \qquad \text{[Math. 2]}$$

or by directly using the time drift dt previously determined in step S330.

In the example of FIG. 6, it is considered that step S340 is implemented during an offset D, corresponding to the period Pcd1 for the first smart card 100 and the period Psk for the server 150. The security code sent by the first smart card 100 is then the code Cc1, which does not correspond to the security code Csk generated by the server 150.

The method can then comprise a sub-step S352 of determining a corrected security code from the time drift dt, this sub-step S352 making it possible to compensate for the time de-synchronization between the first smart card 100 and the server 150.

The corrected security code is determined based on the third reference time data Tr3, the first reference time data Tr1 and the time drift dt.

More specifically, a time tc associated with the corrected security code is calculated by the server 150, from the following formula:

$$tc = Tr3 + (Tr3 - Tr1)*dt \qquad \text{[Math. 3]}$$

The time tc thus corresponds to the second time data of the clock Tc2.

The server 150 then determines which period determined by the server 150 comprises the time tc, then generates the security code corresponding to this period, this security code being the corrected security code.

In the example of FIG. 6, the corrected security code corresponds to the code Csl, corresponding to the period Psi of the server 150.

The server 150 can then compare the corrected security code with the security code received by the server 150 in step S340.

If the corrected security code corresponds to the security code received in step S340, the first smart card 100 can be authenticated by the server 150. The second transaction can then be accepted by the server 150.

If, on the contrary, the corrected security code does not correspond to the security code received in step S340, the first smart card 100 may not be authenticated. The second transaction may then not be accepted by the server 150. The server 150 may also suspect a potential computer attack at the first smart card 100.

As a variant, if the corrected security code does not correspond to the security code received in step S340, the server 150 determines one or several periods following the period comprising the time tc and/or one or several periods preceding the period comprising the time tc, then generates the security code corresponding to this/these period(s), before comparing it with the received security code. If the security code corresponding to a period following or preceding the period comprising the time tc corresponds to the received security code, the second transaction can be accepted by the server 150. The number of period following and/or the number of period preceding the period tc are configurable on the server side 150, for the first smart card 100 or for the manufacturing batch of the first smart card 100. Thus, potential transmission delays can be taken into account by the server 150. The server 150 may also suspect a potential computer attack at the first smart card 100.

As a variant, the server 150 does not compare the corrected security code with the received security code but sends the corrected security code to another server that performs the comparison with the security code it has received, for example from the second transaction terminal, in order to authenticate the first card and to accept or not the second transaction.

As a variant, the behavior determined in step S340 may be a reaction of the first smart card 100 following a computer attack at the first smart card 100.

In another variant, the behavior determined in step S340 is a duration of operation of the first smart card 100.

Indeed, it is possible to determine the state of the first smart card 100 from variations in speed at which the clock 120 derives, and it is thus possible to determine the remaining lifetime of the first smart card 100.

In one example, it is possible to determine that a component of the first smart card 100, such as the quartz oscillator, is defective. Indeed, in such a situation, the clock 120 stops using the quartz oscillator and uses instead the oscillating circuit comprising a resistor and a capacitor.

To this end, the server 150 determines, for one or several smart cards 100, 130 of the same manufacturing batch, typically the first smart card 100 and/or the second smart card 130:
- a time of modification of the drift speed, this modification being able to be caused by a breakage of the quartz oscillator,
- a time from which the smart card 100, 130 is no longer functional, for example when the security code is no longer modified as a function of time, or when the time drift is greater than a given threshold.

This data can then be used to determine the state of smart cards from the same manufacturing batch.

In yet another variant, the behavior determined is a duration of operation of a battery of the first smart card 100.

In these variants, step S340 of determining a behavior typically comprises obtaining a second time data of the clock Tc2 of the first smart card 100 and a third reference time data Tr3 corresponding to a time of reading t3 the second time data of the clock Tc2, during a second transaction implemented by means of said first smart card 100. The second transaction is typically a transaction for which no security code is sent (for example a banking transaction via the electronic chip 216, without contact or with contact). As a variant, the second transaction may be a transaction using a dynamic verification code.

The behavior is then determined based on the third reference time data Tr3. More specifically, the server 150 determines a new time drift of the first smart card 100 from the following formula:

$$dt = \frac{Tc2 - Tr3}{Tr3 - Tr1} \qquad \text{[Math. 4]}$$

Then, the server 150 can determine the behavior based on this new drift or compare this new time drift with the time drift calculated in step S330, then determine the behavior based on this comparison.

Indeed, it is possible to deduce that the battery is reaching the end of its life from variations in the speed at which the clock drifts, the drift being for example accentuated by the supply of a low level of energy.

The step S340 of the method of FIG. 3 can be repeated so as to determine the behavior of another card from the manufacturing batch of the first smart card 100, such as the second smart card 130 in the FIG. 1, or to determine the behavior of the first smart card 100 at another time.

FIG. 8 represents a method for determining a behavior of one or several smart cards, according to one exemplary embodiment of the invention. The common elements or the like in FIGS. 3 and 8 bear the same reference signs.

At a setting time t1, a first reference time data Tr1 can be recorded in the clock 120 of the first smart card 100, typically in the time registers 125 of the clock 120. This recording can be carried out by a personalization terminal, for example during a phase of manufacture of the smart card 100.

The first reference time data Tr1 typically corresponds to the current date and time, at the setting time t1, of a reference clock, such as the atomic clock or the clock of the personalization terminal.

The first reference time data Tr1 is incremented by the clock 120, after its recording in the clock 120.

Following this recording, the server 150 obtains, in a step S810, the first reference time data Tr1 corresponding to the setting time t1. This first reference time data Tr1 is typically transmitted by the personalization terminal having recorded this data in the clock 120. As a variant, the server 150 receives a message from the personalization terminal or from the first smart card 100, then determines the first reference time data Tr1 by consulting the reference clock when the message is received.

Then, in a step S820, the server 150 can obtain a second reference time data Tr2, corresponding to a time of reading t2 a first time data Tc1 of the clock 120 of the first smart card 100.

During this step S820, the first time data of the clock Tc1 can also be obtained by the server 150.

The first time data of the clock Tc1 typically corresponds to the first reference time data Tr1 incremented by the clock 120 during a first duration D1 between the setting time t1 and the reading time t2. More specifically, the first time data of the clock Tc1 can correspond to the first reference time data Tr1 incremented by the clock 120 as a function of the resonant frequency of the oscillator 122 of the clock 120 during the first duration D1.

The second reference time data Tr2 may correspond to the first reference time data Tr1 incremented by the reference clock (for example as a function of the resonant frequency of the clock oscillator of the reference clock), for the first duration D1. The second reference time data Tr2 thus typically corresponds to the current date and time, at the reading time, of the reference clock.

The second reference time data Tr2 is typically obtained during a phase of use of the first smart card 100, during a transaction, called third transaction, implemented by means of the first smart card 100 A transaction terminal, called third transaction terminal, can then read the first time data of the clock Tc1, then transmit the second reference time data Tr2 and the first time data of the clock Tc1 to the server 150, for example in a custom field of an authentication request.

The third transaction is typically a transaction using a dynamic verification code.

As a variant, the server 150 receives a message from the terminal or from the first smart card 100, then determines the second reference time data Tr2 by consulting the reference clock when the message is received.

In a step S830, the server 150 can determine a time drift dt associated with the first smart card 100. The time drift dt is typically the time drift of the clock 120 of the first smart card 100, as a function of the first reference time data Tr1, and of the second reference time data Tr2.

This step S830 can be implemented during the third transaction, implemented by means of the first smart card 100.

The server 150 receives (sub-step S832) a security code corresponding to the current period for the first smart card 100, this current period comprising the first time data of the clock Tc1. The server 150 then generates (sub-step S834) a security code corresponding to the current period for the server 150 at the time of the receiving step S832, according to the reference clock, before comparing (sub-step S836) the received security code and the generated security code.

As a variant, the server 150 does not compare the generated security code with the received security code but sends the generated security code to another server, which makes the comparison with the security code it has received, for example from the third transaction terminal, then sends the result of the comparison to the server 150.

If the received security code does not correspond to (or is different from) the generated security code, the server 150 defines the time drift dt at a given value (sub-step S838).

As a variant, when the server 150 receives the security code sent by the first smart card 100, it directly defines the time drift dt at the given value, without generating a security code.

The given value is typically calculated based on a history comprising one or several time drifts previously determined, each time drift can be a time drift of the clock 120 of the first smart card 100, or a time drift of the clock of another smart card from the same manufacturing batch, such as the second smart card 130.

The time drift dt can also be determined based on one or several pieces of information on the manufacture of the first smart card 100, stored in the server 150. As a variant, this information on the manufacture is stored in another server, such as a server used during the manufacture of the first smart card 100. The server 150 can then communicate with this other server to obtain this information on the manufacture.

Each information on the manufacture can be information on a component of the card (typically the clock 120), information on the conditions of manufacture or information on the storage of the card.

The information on a component of the card can be, for example, a name, a serial number, a manufacturer, a batch number of manufacture or a date of manufacture of the component.

The information on the manufacturing conditions can be a tool used for the manufacture, a date of manufacture, a schedule of manufacture, or a plant of manufacture of the card.

Information on the storage can be the storage location, the storage duration, the storage temperature, etc.

The server 150 can indeed use this information in order to determine a potential modification of the time drift during the lifetime of the smart card. The determination of this potential modification can be based on a time drift calculated for another card from the same manufacturing batch. Indeed, the information on the manufacture is typically similar for each smart card from the same manufacturing batch.

The time drift dt can also be determined based on one or several pieces of information on the use of the first smart card 100, for example stored in the server 150, such as the main country in which the card is used, the type of use, the type of user, etc. The server 150 can again use such information to determine a potential modification of the time drift during the lifetime of the smart card.

The given value is typically of 25 seconds a day.

Then, in a step S840, the server 150 determines a behavior of the first smart card 100 from said time drift dt determined in step S830.

The behavior of the determined smart card is typically a time de-synchronization of the first smart card 100 with respect to the server 150.

The step of determining S840 a behavior of the first smart card 100 then comprises the determination of a first corrected security code from the time drift dt (in step S842).

The time drift dt is for example used in order to determine the period for the first smart card 100 associated with the security code received in the sub-step S832. Then for example, the number of the window is encrypted with a cryptographic key. (This number can consist of an incremented value at each new window).

An example of algorithm used to calculate the security code is specified in RFC 6238 TOTP.

Then, the first corrected security code is compared with the security code received by the server 150 in the sub-step S832 (sub-step S844).

If the first corrected security code corresponds to the received security code, the first smart card 100 can be authenticated by the server 150. The third transaction can then be accepted by the server 150, and the time drift calculated in the sub-step S838 can be recorded in the history of time drifts.

If, on the contrary, the first corrected security code does not correspond to the received security code, the first smart card 100 may not be authenticated. The third transaction may then not be accepted by the server 150. The server 150 may then suspect a potential computer attack at the first smart card 100.

As a variant, if the first corrected security code does not correspond to the received security code, the server 150 can determine a second security code, corresponding to a period following or a period preceding the period corresponding to the first corrected security code (sub-step S846).

Next, the second corrected security code is compared with the security code received by the server 150 in the sub-step S832 (sub-step S848).

If the second corrected security code corresponds to the received security code, the first smart card 100 can be authenticated by the server 150. The third transaction can then be accepted by the server 150.

The time drift dt of the first smart card 100 can then be modified by the server 150 (sub-step S850), typically as a function of the period corresponding to the second security code, then be recorded in the history of time drifts.

The modified time drift dm can be calculated from the following formula:

$$dm = \frac{T_{2T} - T_{1T}}{Tr2 - Tr1} \quad \text{[Math. 5]}$$

Where $T_{1T}$ is a time data corresponding to the time of the beginning of the period comprising the time Tr2 and $T_{2T}$ is a time data corresponding to the time of the beginning of the period which corresponds to the second security code.

If, on the contrary, the second corrected security code does not correspond to the received security code, the first smart card 100 may not be authenticated. The third transaction may then not be accepted by the server 150. The server 150 may then suspect a potential computer attack at the first smart card 100.

As a variant, the sub-steps S846, S848, S850 can be repeated, for other periods. This variant is typically implemented when the third transaction is the first transaction made by means of the first smart card 100, this first transaction being typically a zero amount transaction.

As a variant, the server 150 does not compare the first corrected security code and/or the second corrected security code with the received security code but sends the first corrected security code and/or the second corrected security code to another server that makes the comparison with the security code it has received, for example from the third transaction terminal, in order to authenticate the first smart card and accept or not the third transaction.

The method of FIG. 8 can be combined with the method of FIG. 3. In one example, steps S830 and S840 of FIG. 8 can be implemented after step S340, typically during another transaction. In another example, the step S840 of FIG. 8 can be implemented after step S330.

The invention claimed is:

1. A method for determining a behavior of a first smart card, the method being implemented by a server, and comprising:
    obtaining a first reference time data corresponding to a time of setting a clock of the first smart card or a second smart card, and a second reference time data corresponding to a time of reading a first time data of said clock;
    determining a time drift associated with the first smart card based on said first reference time data and on said second reference time data; and
    determining a behavior of the first smart card from said time drift, wherein the determining a behavior of the first smart card comprises:
        determining a variation in a speed at which said clock drifts by comparing said time drift with a previously determined time drifts, and
        determining a remaining lifetime of the first smart card based on the variation in the speed at which said clock drifts;
    determining a corrected card security code from said time drift; and
    comparing the corrected card security code with a received card security code, wherein:
        said second reference time data is received during a phase of use of the first smart card, during a third transaction implemented by the first smart card,
        the determination of the time drift comprising a definition of the time drift at a given value, and
        the time drift being modified if the corrected card security code is different from the received card security code.

2. The method according to claim 1, wherein the first smart card comprises said clock.

3. The method according to claim 1, wherein the second smart card comprises said clock, and the first smart card and the second smart card are from a same manufacturing batch.

4. The method according to claim 3, wherein
    the step of obtaining a first reference time data comprises receiving said first reference time data of the clock.

5. The method according to claim 1, wherein the server is an authentication server, able to authenticate the first smart card.

6. The method according to claim 1, wherein the time drift is also determined based on information on a manufacture or use of the first smart card, stored in the server.

7. The method according to claim 1, wherein the step of determining a behavior comprises:
    obtaining a second time data of the clock of the first smart card, and a third reference time data corresponding to a time for reading the second time data of the clock, during a second transaction implemented by said first smart card, wherein the determined behavior is determined based on the third reference time data.

8. The method according to claim 1, wherein the given value is determined based on the previously determined time drift.

9. A server comprising:
a memory containing instructions; and
a processor that is operably connected to the memory and that executes the instructions to perform operations for determining a behavior of a first smart card, the operations comprising:
obtaining a first reference time data corresponding to a time of setting a clock of the first smart card or a second smart card, and a second reference time data corresponding to a time of reading a first time data of said clock;
determining a time drift associated with the first smart card based on said first reference time data and on said second reference time data; and
determining a behavior of the first smart card from said time drift, wherein the determining a behavior of the first smart card comprises:
determining a variation in a speed at which said clock drifts by comparing said time drift with a previously determined time drift, and
determining a remaining lifetime of the first smart card based on the variation in the speed at which said clock drifts;
determining a corrected card security code from said time drift; and
comparing the corrected card security code with a received card security code, wherein:
said second reference time data is received during a phase of use of the first smart card, during a third transaction implemented by the first smart card,
the determination of the time drift comprising a definition of the time drift at a given value, and
the time drift being modified if the corrected card security code is different from the received card security code.

10. The server of claim 9, wherein said first smart card comprises said clock.

11. The server of claim 9, wherein the second smart card comprises said clock, and the first smart card and the second smart card are from a same manufacturing batch.

12. The sever of claim 9, wherein the server is an authentication server, able to authenticate the first smart card.

13. The server of claim 9, wherein the time drift is also determined based on information on a manufacture or use of the first smart card, stored in the server.

14. A non-transitory computer-readable recording medium on which a computer program is recorded comprising instructions that when executed by a computer, perform operations for determining a behavior of a first smart card, the operations comprising:
obtaining a first reference time data corresponding to a time of setting a clock of said first smart card or a second smart card, and a second reference time data corresponding to a time of reading a first time data of said clock;
determining a time drift associated with the first smart card based on said first reference time data and on said second reference time data; and
determining a behavior of the first smart card from said time drift, wherein the determining a behavior of the first smart card comprises:
determining a variation in a speed at which said clock drifts by comparing said time drift with a previously determined time drift, and
determining a remaining lifetime of the first smart card based on the variation in the speed at which said clock drifts;
determining a corrected card security code from said time drift; and
comparing the corrected card security code with a received card security code, wherein:
said second reference time data is received during a phase of use of the first smart card, during a third transaction implemented by the first smart card,
the determination of the time drift comprising a definition of the time drift at a given value, and
the time drift being modified if the corrected card security code is different from the received card security code.

15. The non-transitory computer-readable medium of claim 14, wherein:
the second smart card comprises said clock, and the first smart card and the second smart card are from a same manufacturing batch,
the step of obtaining a first reference time data comprises receiving said first reference time data of the clock.

16. The non-transitory computer-readable medium of claim 14, wherein the step of determining a behavior comprises:
obtaining a second time data of the clock of the first smart card, and a third reference time data corresponding to a time for reading the second time data of the clock, during a second transaction implemented by said first smart card,
wherein the determined behavior is determined based on the third reference time data.

17. The non-transitory computer-readable medium of claim 14, wherein the given value is determined based on the previously determined time drift.

* * * * *